UNITED STATES PATENT OFFICE.

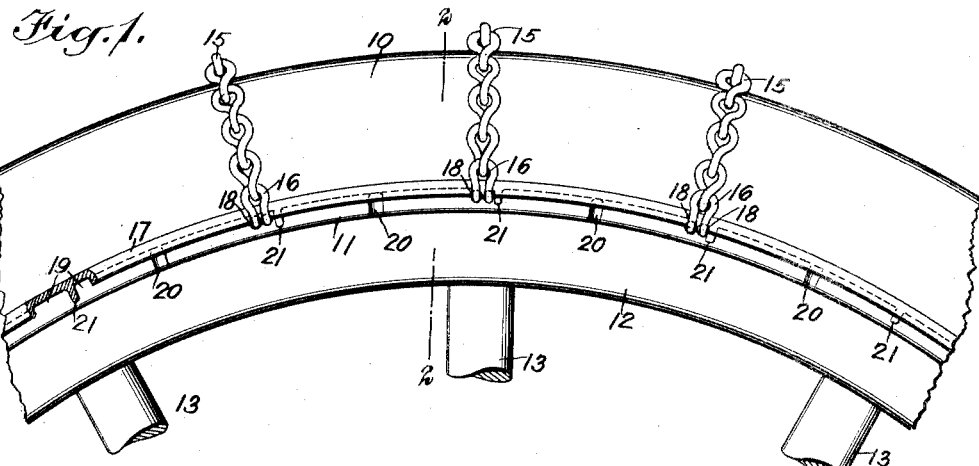
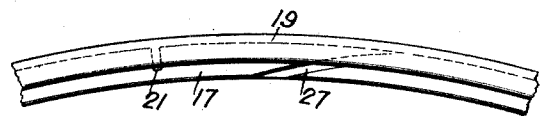
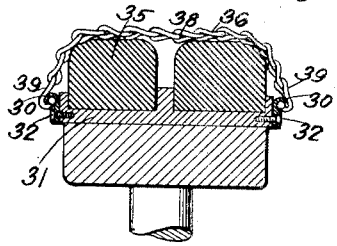
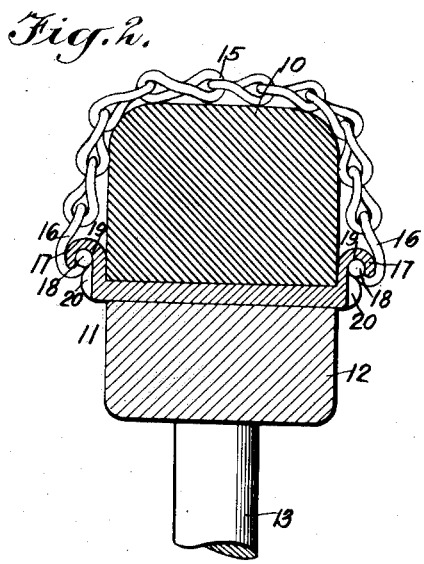
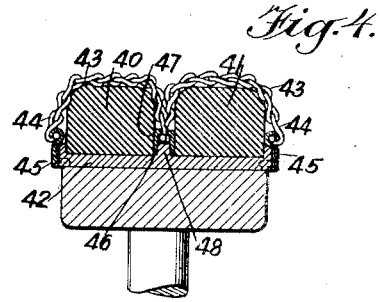
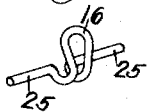

THADDIOUS V. ELLIOTT, OF NEW YORK, N. Y.

ANTISKIDDING DEVICE.

1,390,893.  Specification of Letters Patent.  Patented Sept. 13, 1921.

Application filed September 17, 1918, Serial No. 254,460. Renewed December 17, 1920. Serial No. 431,502.

*To all whom it may concern:*

Be it known that I, THADDIOUS V. ELLIOTT, a citizen of the United States, and a resident of the city of New York, borough of Manhattan, in the county and State of New York, have invented a new and Improved Antiskidding Device, of which the following is a full, clear, and exact description.

The object of the invention is to provide a new and improved antiskidding device for use on wheels of automobiles, auto-trucks and other vehicles, and arranged to permit of conveniently and quickly placing the device in position on the wheel to prevent skidding thereof, or to allow removing it from the wheel whenever it is desired to do so. Another object is to provide an antiskidding device which is exceedingly simple and durable in construction and cheap to manufacture. Another object is to permit quick repair in case any one of the antiskidding members is damaged or worn out.

With these and other objects in view, the invention consists of novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a side elevation of a portion of an automobile truck wheel provided with the antiskidding device;

Fig. 2 is an enlarged cross section of the same on the line 2—2 of Fig. 1;

Fig. 3 is a cross section of a modified form of the antiskidding device as applied to a wheel having a two-part tread;

Fig. 4 is a similar view of another modified form of the antiskidding device applied to a wheel having a two-part tread;

Fig. 5 is a side elevation of a portion of a moidfied form of the rim ring; and

Fig. 6 is a perspective view of a modified form of a hook for use on the flange ring shown in Fig. 5.

The tire 10 of any approved construction is mounted in any suitable manner on the rim 11 of a felly 12 carried by the spokes 13 of a vehicle wheel. The antiskidding device applied to this wheel comprises essentially a plurality of antiskidding members 15 spaced apart and preferably in the form of chains extending across the tire 10, as plainly indicated in Figs. 1 and 2. The ends of each antiskidding member 15 are in the form of hooks 16 engaging channel rings 17 formed on the sides of the rim 11. Each hook 16 has its terminals 18 enlarged and fitting a correspondingly shaped channel 19 in the ring 17 to prevent accidental unhooking of a hook from the corresponding channel ring 17.

The channel ring 17 is provided with spaced notches 20 and with stop lugs 21 intermediate adjacent notches 20, as plainly indicated in Fig. 1. By the arrangement described, the enlarged ends 18 of the hooks 16 can be readily passed by way of the notches 20 into the corresponding channel 19 of the channel ring 17 until the enlarged terminals of an antiskidding member 15 abuts against the corresponding lug 21 to hold the antiskidding member against creeping. It will be noticed that by the arrangement described the antiskidding members 15 are held spaced apart like distances whereby the antiskidding devices are distributed uniformly on the tire to prevent skidding when the wheel is rotating as, at least, one of the antiskidding devices is in contact at the time with the roadway.

Instead of thickening the terminals of a hook 16, the terminals may be made in the form of sidewise extensions 25, as plainly shown in Fig. 6, but in this case instead of radially disposed entrance notches 20, inclined or slanting passages or grooves 27, as shown in Fig. 5, are employed to permit of readily passing the extensions 25 along the passages or grooves 27 to engage the channels 19 of the channel rings 17, as previously explained. The channel ring is provided with the stop lugs 21, the same as above described, to limit the movement of the corresponding antiskidding member 15.

Instead of making the channel ring 17 an integral part of the rim 11, such channel ring 30 may be made separate from the rim 31 and fastened thereto by screws 32, as plainly indicated in Fig. 3, which in this case shows a tread made in two parts 35, 36 over which extends the antiskidding member 38 having its hooks 39 engaging the channel rings 30 in the manner above explained.

As shown in Fig. 4, the two parts 40 and 41 of the tread are mounted on a rim 42, and each part 40 and 41 is provided with antiskidding members 43 having hooks 44 engaging channel rings 45 and 46, of which the channel rings 45 are attached to the outer sides of the rim 42 while the inner hooks 44 are attached to a channel ring 47 secured to the divisional flange 48 forming part of the rim 42 and extending between the two tread parts 40 and 41.

From the foregoing it will be seen that the channel rings can be made separate and readily attached to rims as now generally constructed, thus permitting the use of the antiskidding device on wheels now in use. For new wheels, however, the channel rings 17 are preferably formed integrally with the sides of the rim 11, but, as previously stated, they may be made separate and attached to the rim by screws or other fastening devices.

Having thus described my invention, I claim as new and desire to secure by Letters Patent:—

1. In a wheel, antiskidding members extending independent one of the other and in spaced relation across the wheel tire, each antiskidding member being provided at the ends with hooks, and a wheel rim having longitudinal channel rings at the sides with which the hooks engage, the said channel rings having spaced notches to permit the engagement of the said hooks with the channel rings and the latter having spaced lugs in the paths of the said hooks to limit the movement of the hooks in the channel rings.

2. In a wheel, antiskidding members extending independent one of the other and in spaced relation across the wheel tire, each antiskidding member being in the form of a chain having enlarged sidewise extending terminals and a wheel rim having longitudinal channel rings at the sides with which the said enlarged terminals of the hooks engage, the said channel rings having spaced inclined passages to permit engagement of the said hook terminals with the said channel rings, the latter having spaced stop lugs each located intermediate adjacent passages.

THADDIOUS V. ELLIOTT.